(12) United States Patent
Kumar et al.

(10) Patent No.: US 8,457,130 B2
(45) Date of Patent: Jun. 4, 2013

(54) SYNCHRONIZING SEQUENCE NUMBERS

(75) Inventors: Prashant Kumar, Andover, MA (US);
Jitender Arora, Nashua, NH (US);
Cheng Liu, Acton, MA (US)

(73) Assignee: Acme Packet, Inc., Beford, MA (US)

( * ) Notice: Subject to any disclaimer, the term of this patent is extended or adjusted under 35 U.S.C. 154(b) by 63 days.

(21) Appl. No.: 13/098,575

(22) Filed: May 2, 2011

(65) Prior Publication Data

US 2012/0281522 A1    Nov. 8, 2012

(51) Int. Cl.
*H04L 12/28* (2006.01)

(52) U.S. Cl.
USPC ........... 370/394; 370/219; 370/243; 370/244; 370/401

(58) Field of Classification Search
USPC ...... 370/216–228, 242–245, 394, 401; 714/2, 714/11, 12
See application file for complete search history.

(56) References Cited

U.S. PATENT DOCUMENTS

| | | | | |
|---|---|---|---|---|
| 6,912,197 B2 * | 6/2005 | Mahamuni | ................... | 370/219 |
| 7,571,343 B1 * | 8/2009 | Xiang et al. | ...................... | 714/2 |
| 7,836,497 B2 * | 11/2010 | Hossain et al. | ................. | 726/15 |
| 2007/0076594 A1 * | 4/2007 | Khan et al. | ..................... | 370/220 |
| 2009/0287955 A1 * | 11/2009 | Matsumoto et al. | ............... | 714/4 |

* cited by examiner

*Primary Examiner* — Christopher Grey
(74) *Attorney, Agent, or Firm* — Thomas | Horstemeyer, LLP

(57) ABSTRACT

Systems and methods are disclosed for synchronizing sequence numbers in a packet flow. One such method includes receiving a sequence number synchronization request from a redundancy peer. The sequence number synchronization request is associated with a packet flow. The method also includes incrementing by a fixed amount a packet sequence number for the packet flow, after the sequence number synchronization request. The method also includes transmitting a next packet including the incremented packet sequence number to the communication peer.

21 Claims, 12 Drawing Sheets

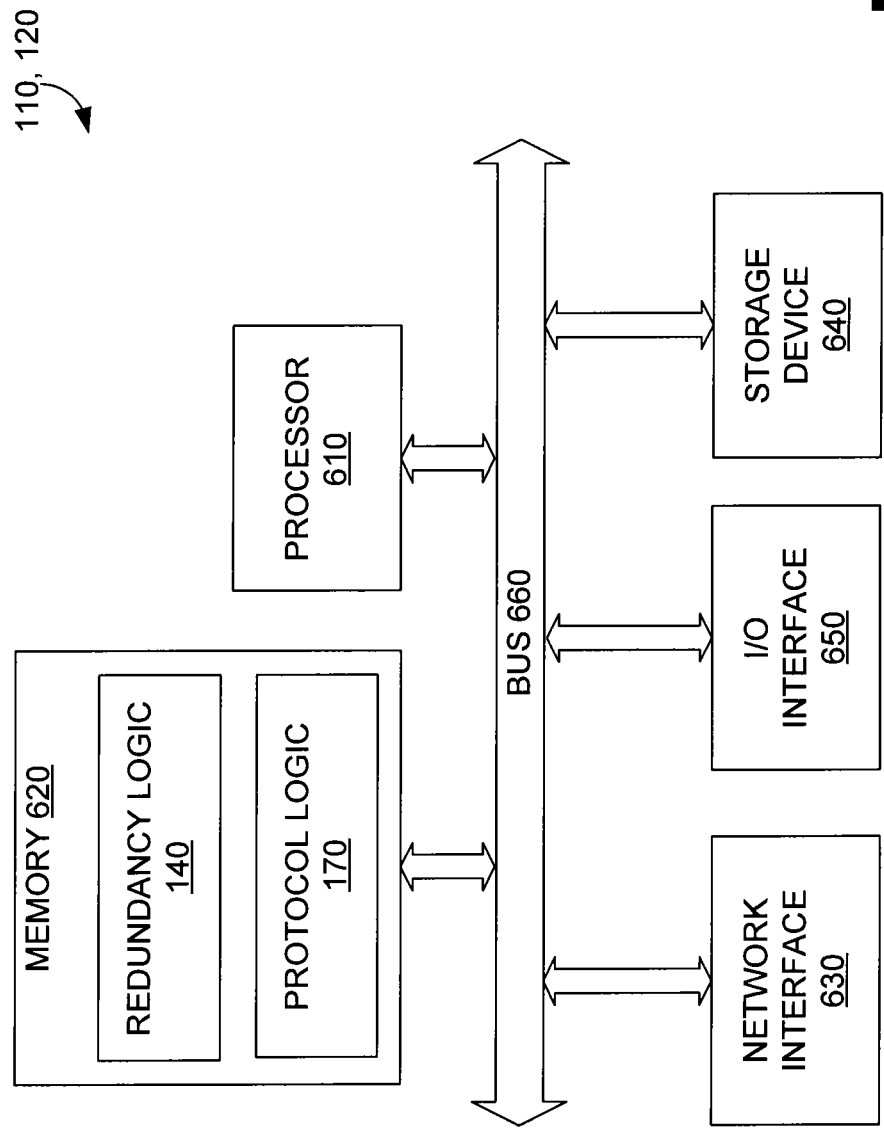

SYNCHRONIZING SEQUENCE NUMBERS

CROSS REFERENCE TO RELATED APPLICATIONS

Not applicable.

TECHNICAL FIELD

The present disclosure generally relates to network communications and more particularly relates to systems and methods for synchronizing sequence numbers in packet flows.

BACKGROUND

A network provider may use redundant network devices allow the network to remain operational when one device is not functioning for any of a variety of reasons, including planned events such as upgrade or maintenance or unplanned events such as a crash or malfunction. One network device, designated as the active device, operates as usual while one or more peer network devices operate in standby mode. In order for the standby device to take over after an unexpected failure of the active device, the standby device typically receives periodic state information from the active device. The standby device can use this state information to recreate the state of the active device before switchover, thus becoming the active device. Some types of network environments may require frequent state updates and/or significant amounts of state information.

SUMMARY

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 6 is a block diagram of the active network device and/or the standby network device of FIG. 1, according to some embodiments disclosed herein.

DETAILED DESCRIPTION

Figure 1:
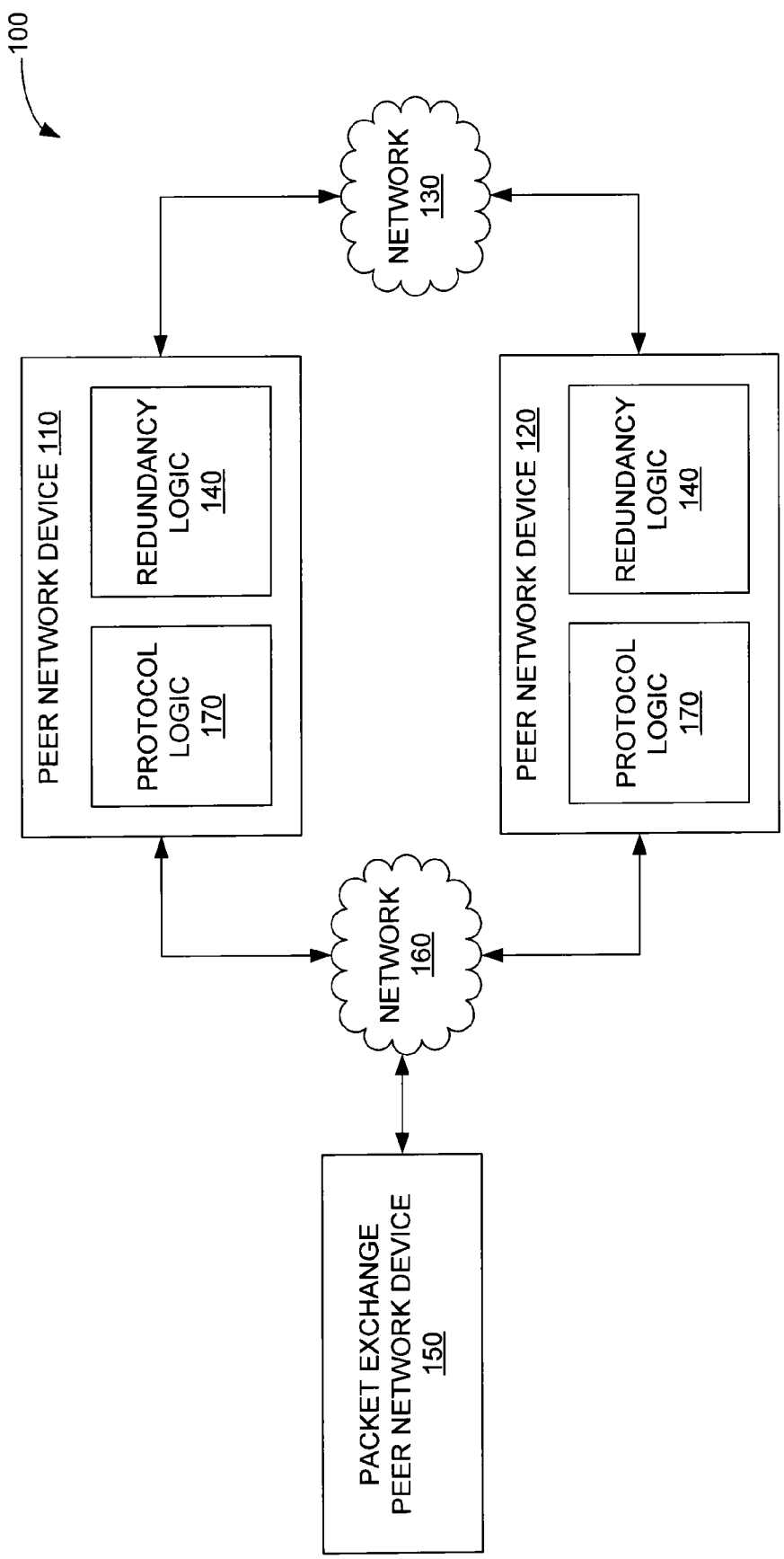
FIG. 1 is a high-level block diagram of a network environment including a network device having redundancy logic, according to some embodiments disclosed herein.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications, and equivalents included within the spirit and scope of the disclosure as defined by the appended claims.

FIG. 1 is a high-level block diagram of a network environment including a network device having redundancy logic. The environment 100 includes peer network devices 110, 120 which cooperate to provide redundancy for the network functionality of a network device. One of the peer network devices, the active network device 110, takes the active role while the standby network device 120 takes the standby role. The peer network devices 110, 120 communicate with each other via a network 130 to exchange commands, status indications, and state updates. Under certain conditions, the peer network devices 110, 120 may perform a switchover, such that standby network device 120 assumes the active role. As should be appreciated, a set of peer network devices may include more than one standby, and an active network device may transition to standby after switchover. The functionality described above is provided by redundancy logic 140 within peer network devices 110, 120. Redundancy logic 140 may be implemented in software, hardware, or some combination thereof as will be further described below.

Each of peer network devices 110, 120 is also in communication with another network device 150 via a network 160. The network device 150 exchanges packets with whichever peer device is the active one, using a protocol or protocol suite 170. The protocol suite discussed herein is secure Internet protocol, commonly referred to as IPsec. However, the principles described herein also apply to other protocols, protocol families, and/or protocol suites. Typically, the network device 150 is located remotely from the peer network devices 110, 120, though this is not a requirement. Whereas network device 110 and network device 120 have a redundancy peering relationship to each other, network device 150 has another type of peering relationship: a packet exchange peering relationship. Network device 150 will thus be referred to herein as a packet exchange peer device 150.

Thus, several different peering relationships are shown in FIG. 1. Network device 110 and network device 120 are each redundant peers with respect to each other. At a particular point in time, packet exchange peer device 150 is a packet exchange peer with respect to one of peer network devices 110, 120, namely, the one that has the active role.

Figure 2A:
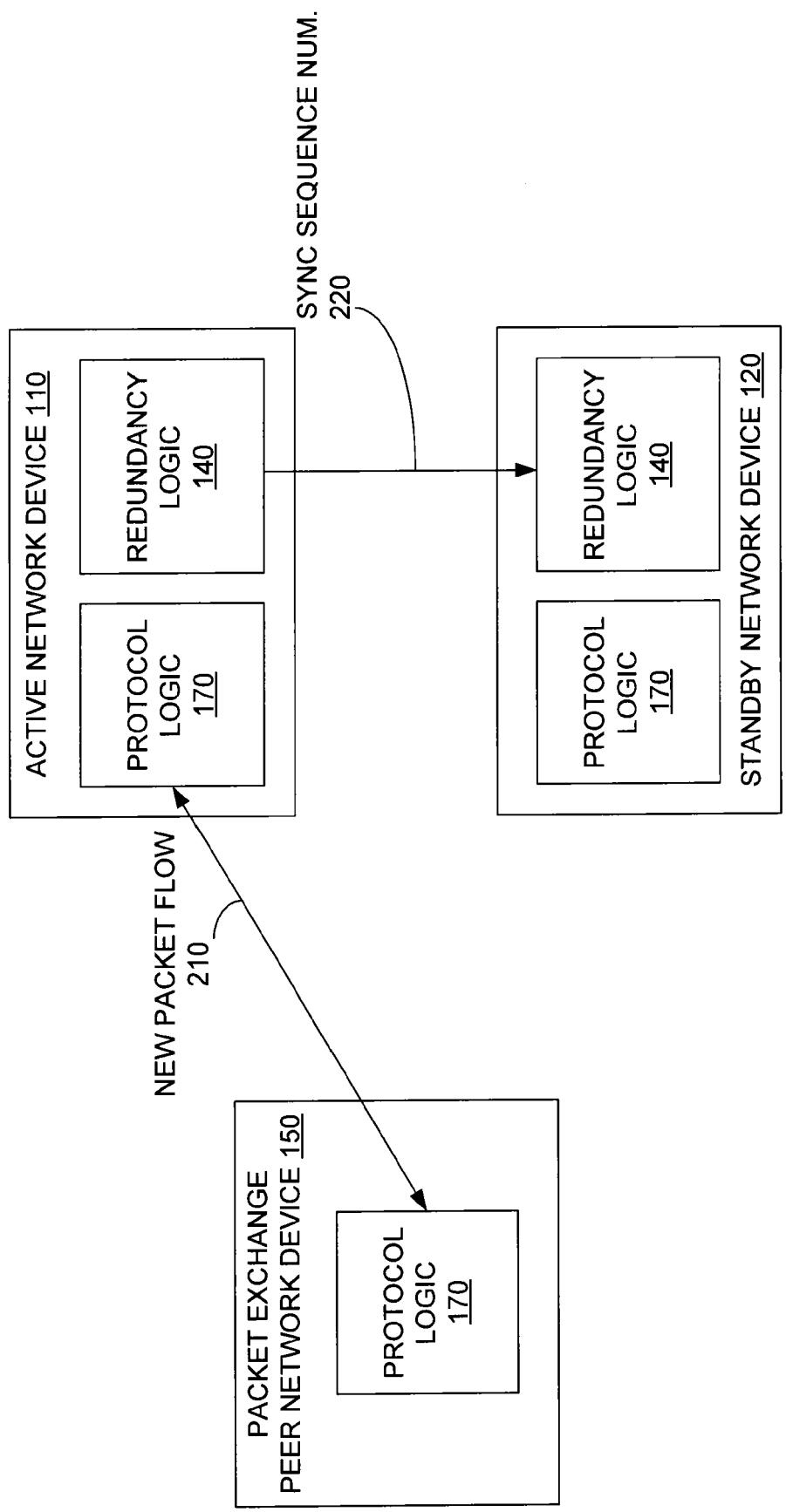
FIGS. 2A-2C form a sequence diagram showing interaction among the components of FIG. 1, according to some embodiments disclosed herein.
Figure 2B:
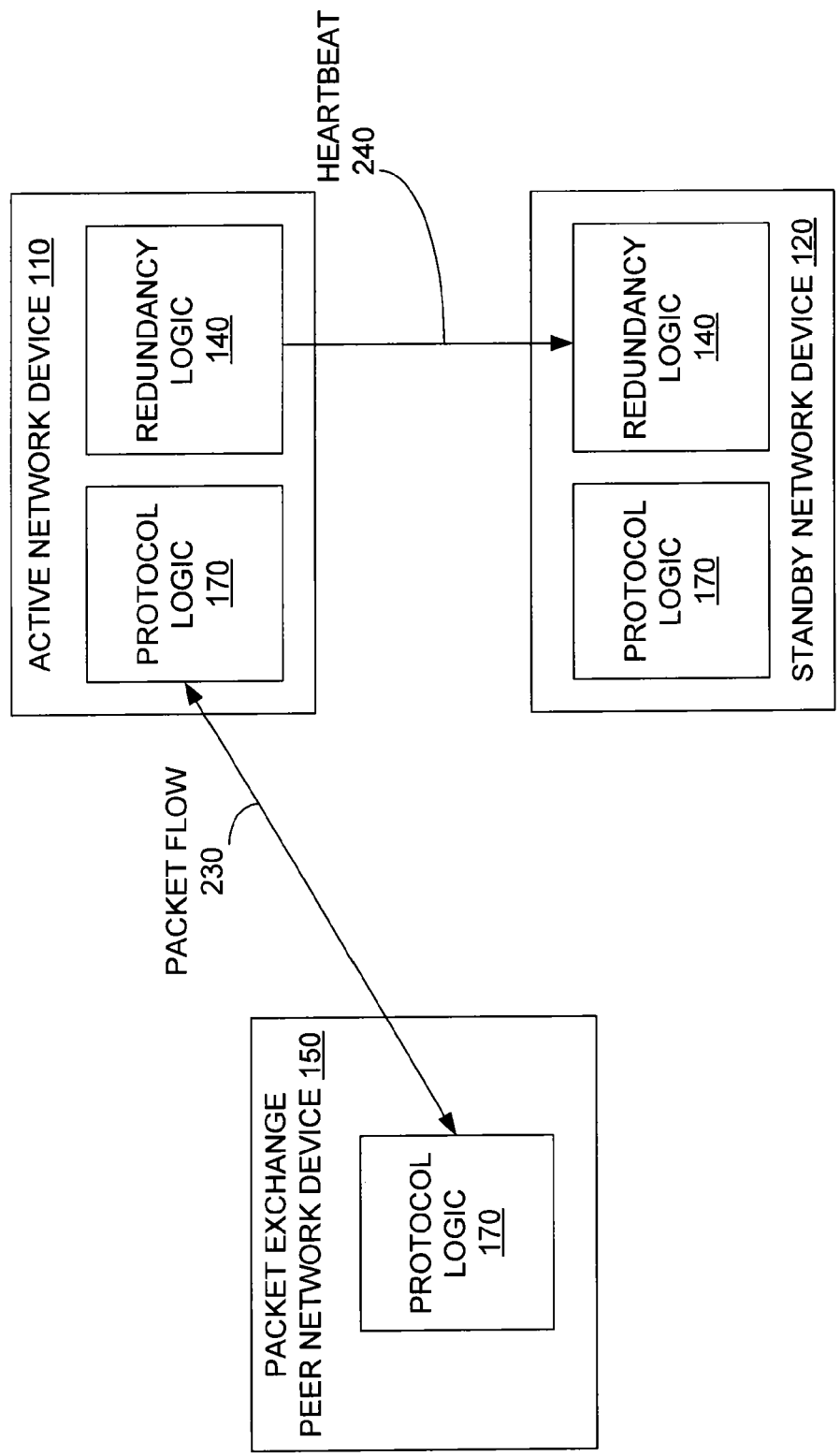
Figure 2C:
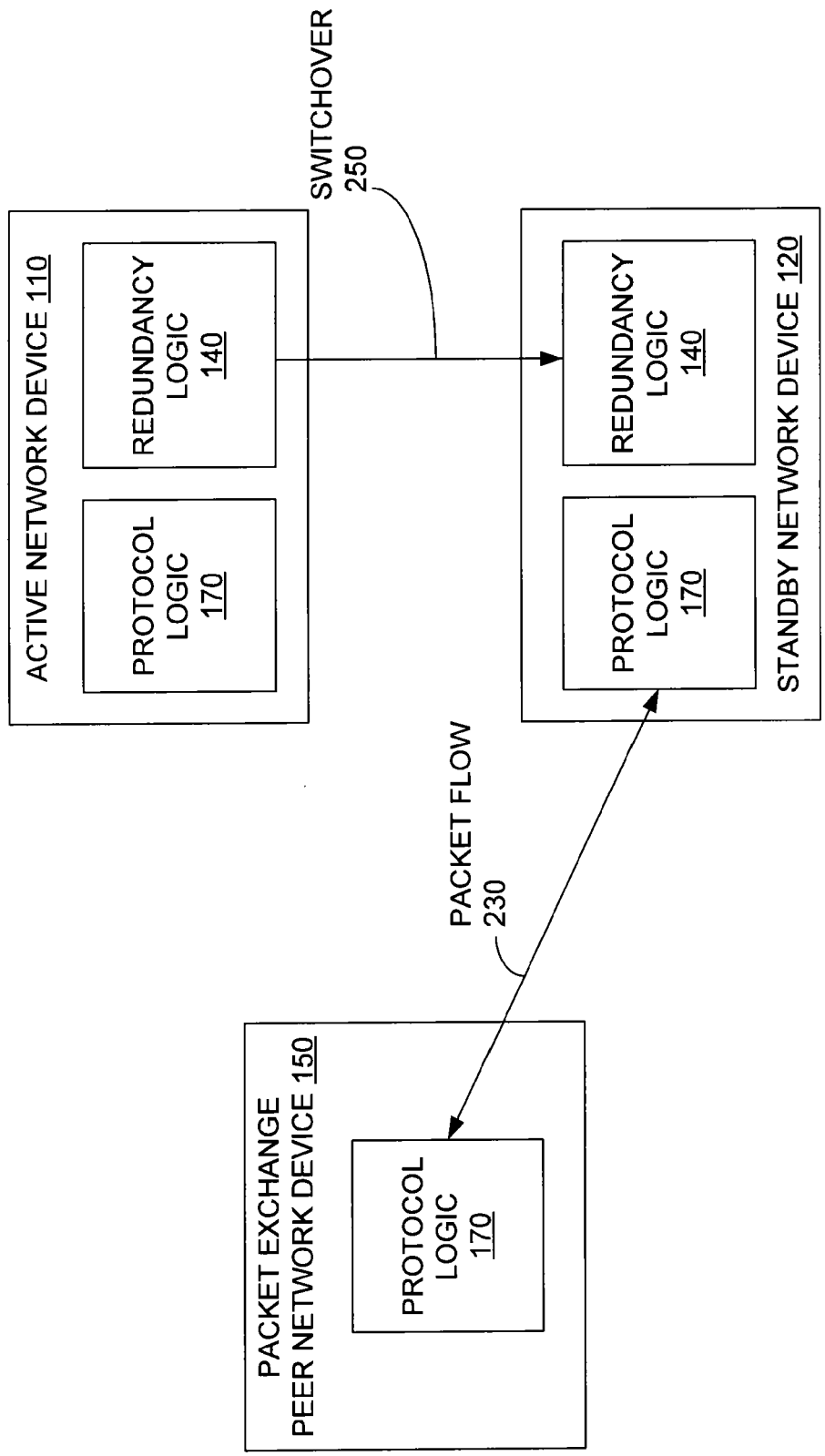

FIGS. 2A-2C form a sequence diagram showing interaction among the components of FIG. 1, according to some embodiments. Packet exchange peer device 150 and peer network devices 110, 120 each include functionality which provides redundancy, represented by redundancy logic 140, as well as functionality which exchanges packets, represented by protocol logic 170. Packet exchange peer device 150 and active network device 110 typically exchange many packets of many different types. Some of these packet exchanges take the form of packet flows. A flow of packets, as understood by a person of skill in the art, is a sequence of packets between two endpoints using a particular protocol. The device itself may act as an endpoint, or multiple endpoints may exist within a device, differentiated by an identifier such as a port, a socket, etc. The packet flow may be unidirectional or bidirectional. The packets within the flow may include sequence numbers.

Start of a new packet flow between protocol logic 170 components within packet exchange peer device 150 and active network device 110 is represented by event 210. In some embodiments, event 210 is generated by protocol logic 170 (e.g., when flow creation is an explicit part of the protocol). In other embodiments, redundancy logic 140 interacts with protocol logic 170 to learn of a new flow, and redundancy logic 140 generates event 210. It should be appreciated that new packet flow event 210 may be generated for particular types of packets rather than for all types of packets. Devices 110, 120, and 150 may utilize many different types of packets in performing their respective network functions (e.g., IP, TCP, RTP, IPsec, etc.), some of which involve packet flows. However, the synchronization function disclosed herein may apply to particular types of packet flows and not others, such that new packet flow event 210 occurs for only particular flow types (e.g., IPsec).

In response to new packet flow event 210, redundancy logic 140 within active network device 110 instructs redundancy logic 140 within standby network device 120 to create the same flow but using a different sequence number. Specifically, active network device 110 sends a synchronize sequence number event 220 to standby network device 120, where synchronize sequence number event 220 includes a sequence number and may also include packet flow information, such as a flow identifier, etc. The sequence number included in synchronize sequence number event 220 informs standby network device 120 of the starting sequence number which active network device 110 will use for the newly created packet flow. In some embodiments, the first synchronize sequence number event 220 received by standby network device 120 specifies a flow sequence number of zero, because that first synchronization is associated with creation of a new flow. However, a flow may be synchronized at a later time, for example, when the current standby network device 120 is switched to active. When a flow is synchronized after flow creation, then the sequence number specified in the synchronize sequence number event 220 is non-zero.

Standby network device 120 uses the sequence number in synchronize sequence number event 220, provided by active network device 110, to generate a new sequence number which is used later, when and if standby network device 120 takes over as the active device. The specific manner in which the sequence number is generated by standby network device 120 allows standby network device 120 to take over packet transmission for the flow in a manner which is not viewed by packet exchange peer device 150 as an error. Synchronization and sequence number generation will be described in further detail in connection with FIG. 5.

Moving on to FIG. 2B, the flow of packets continues between protocol logic 170 components within packet exchange peer device 150 and active network device 110, as indicated by flow 230. As mentioned above, in addition to providing a network function through protocol logic 170, active network device 110 and standby network device 120 also cooperate to make this network function redundant. To this end, active network device 110 periodically sends an event 240 to standby network device 120, which lets standby network device 120 know that active network device 110 is still operating as the active device. Event 240 may be viewed, for example, as a keep-alive, a ping, or a heartbeat. Periodic event 240 does not include a sequence number for flow 230. Instead, the process used to generate the flow sequence number for flow 230 (described herein) allows standby network device 120 to process packets as soon as standby network device 120 becomes active.

Turning now to FIG. 2C, after some number of packets are exchanged between packet exchange peer device 150, standby network device 120 receives a switchover event 250, indicating that standby network device 120 should now take over in the active role. In FIG. 2C, switchover event 250 is indicative of a graceful failover and originates from active network device 110. However, in a hard failover scenario, switchover event 250 may instead originate internally within standby network device 120, for example, as a result of a timeout indicating loss of communication with active network device 110 (e.g., ceasing to receive a heartbeat packet).

Having received switchover event 250, standby network device 120 seamlessly takes over as the new active network device, which includes operating as peer to packet exchange peer device 150. As such, standby network device 120—now operating in active rather than standby role—participates in packet flow 230 with packet exchange peer device 150. Since standby network device 120 generated a new starting sequence number for flow 230 when it first received the synchronize sequence number event 220 (FIG. 2A), standby network device 120 is ready to process packets for flow 230 immediately after switchover. The first packet in the flow transmitted after the transition to active uses this specially generated sequence number, then successive packets transmitted by standby network device 120 increase from this starting point. This handling of sequence numbers applies to each flow. The use of this special sequence number allows standby network device 120 to avoid monitoring the sequence numbers actually transmitted by active network device 110 while being able to take over from active network device 110 without causing an error in the sequence number expected by protocol logic 170 within packet exchange peer device 150.

In a graceful failover, network device 110 transitions automatically to the standby role after relinquishing the active role. As part of this transition, now-standby network device 110 synchronizes its flow-specific starting sequence numbers with those used by now-active network device 120. Messages from now-active network device 120 are not used to achieve this synchronization after graceful failover. Instead, now-standby network device 110 increments its local starting sequence number by a multiple of the amount used by active network device 120. In some embodiments, this multiple is two. The increment process will be described further in connection with FIG. 5.

In contrast, after a hard failover, now-active network device 120 instructs now-standby network device 110 to synchronize the sequence number of the flow, by sending synchronize sequence number event 220 to now-standby network device 110. As described earlier, synchronize sequence number event 220 includes the starting sequence number which now-active network device 120 will use for the packet flow. Now-active network device 120 synchronizes sequence numbers for all flows in this manner. In some embodiments, starting sequence numbers for multiple flows may be combined into the same synchronize sequence number event 220. In other embodiments, the starting sequence number for each flow is provided in a separate synchronize sequence number event 220.

Figure 3A:
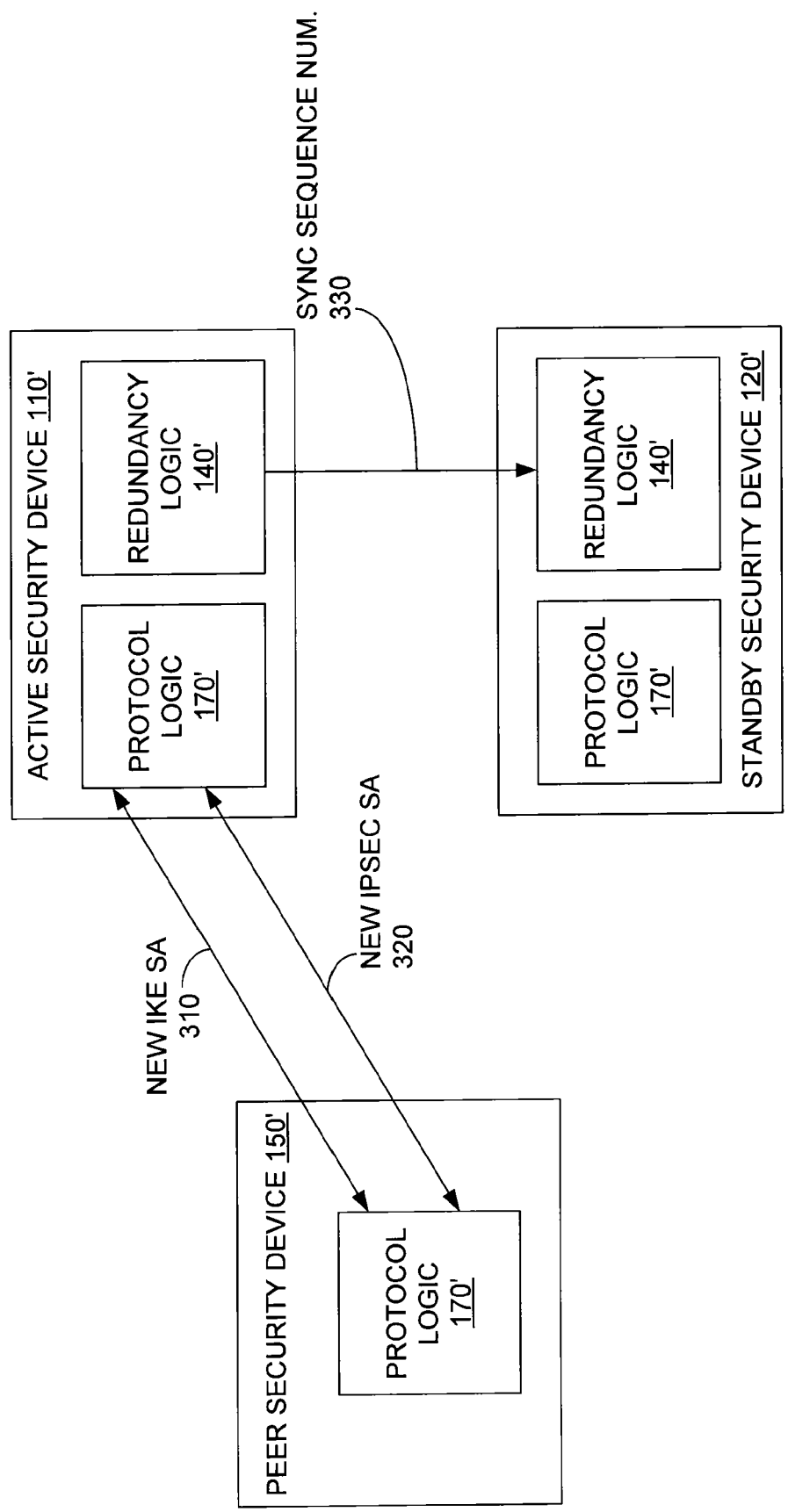
FIGS. 3A-3C form a sequence diagram showing interaction among the components of FIG. 1, according to other embodiments disclosed herein.
Figure 3B:
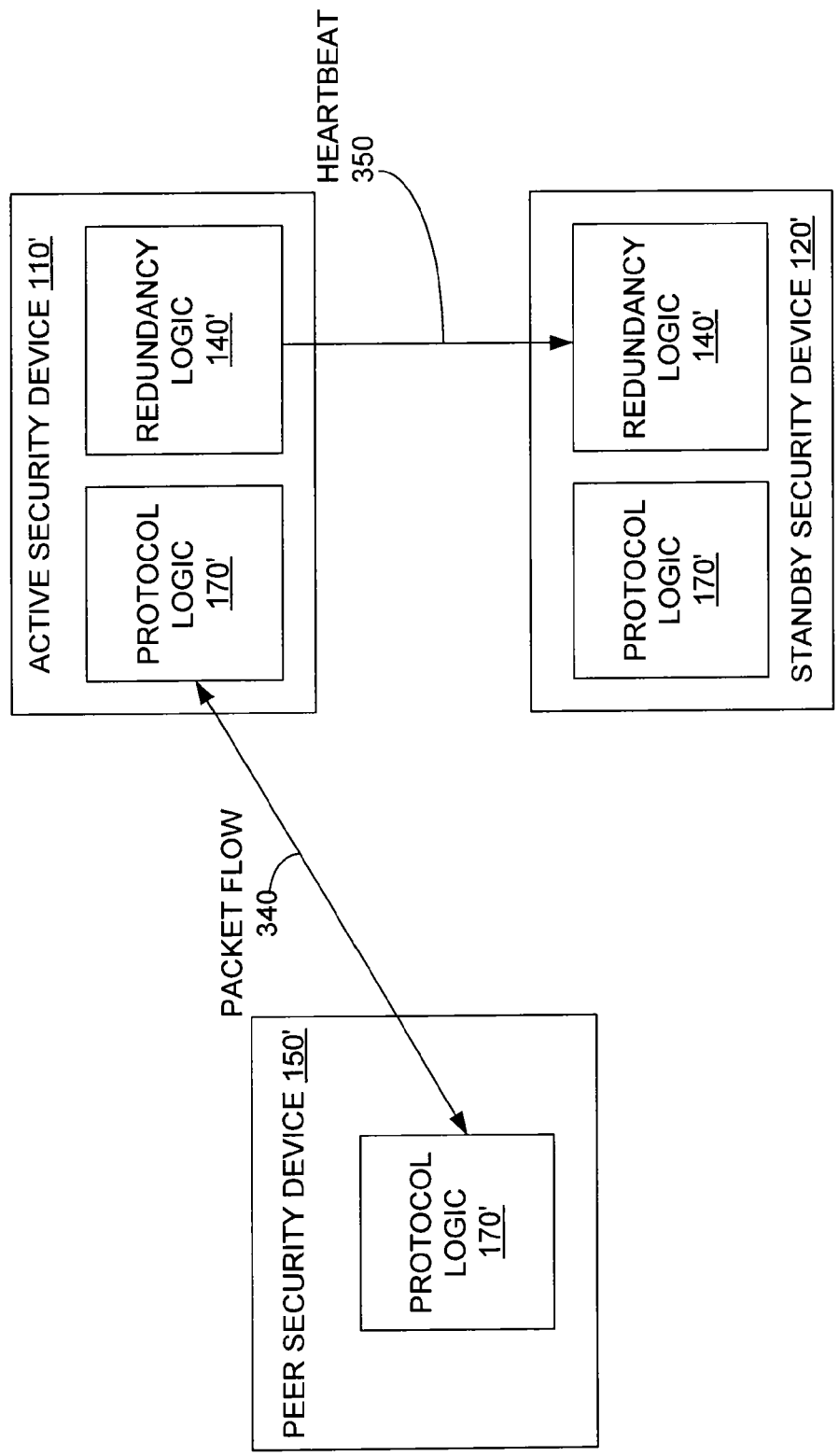
Figure 3C:
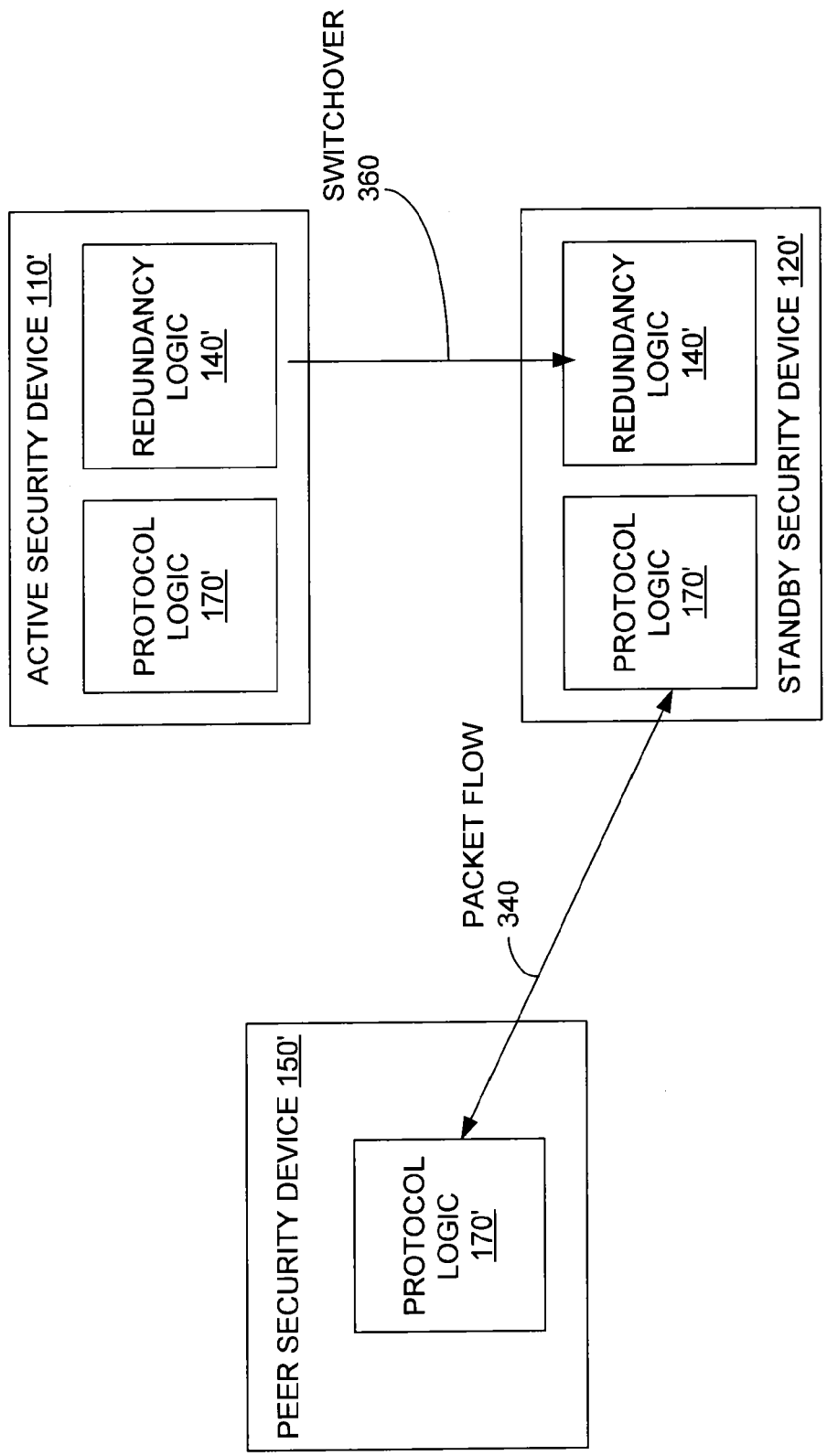

The embodiment described in connection with FIGS. 2A-2C discussed the protocol used by devices 110, 120, 150 in generic terms, and referred to the devices themselves using the generic terms packet exchange peer device, active network device, and standby network device. The sequence diagram of FIGS. 3A-3C illustrates operation of devices 110, 120, 150 when the IPsec family of protocols is used, for example to provide virtual private networks (VPNs) between sites. In recognition of this role, the devices in FIGS. 3A-3C are referred to as active security device 110', standby security device 120', and peer security device 150'.

As should be known to a person of skill in the art, IPsec is a protocol family including Internet Key Exchange (IKE) and at least one of Authentication Header (AH) and Encapsulating Security Payload (ESP). IPsec relies on security associations (SAs), where an SA is the bundle of algorithms and parameters (such as keys) used to encrypt and authenticate a particular packet flow in one direction. A bi-directional packet flow is thus secured by a pair of SAs. In some embodiments, specialized hardware may be used to create the SAs, to perform authentication, to perform encryption, etc.

IPsec protocol logic 170' within peer security device 150' and active security device 110' cooperate to create an IKE security association (SA) (event 310). IPsec protocol logic 170' then creates an IPsec SA (event 320) under the protection of the IKE SA. As noted above, redundancy logic 140 may synchronize sequence numbers for some types of flows and not others. In the IPsec embodiment of FIGS. 3A-3C, IPsec redundancy logic 140' on standby 120' is at least responsible for synchronizing each inbound and outbound IPsec SA to standby security device 120' and for generating the sequence numbers for each outbound IPsec SA.

Thus, in response to creation of a new IPsec SA at event 320, redundancy logic 140 within active security device 110' instructs redundancy logic 140 within standby security device 120' to create the same IPSec SA flow but using a different sequence number. Specifically, active security device 110' sends a synchronize sequence number event 330 to standby security device 120' where synchronize sequence number event 330 includes a starting sequence number and may also include packet flow information, such as a flow identifier, SA, etc. On receipt of synchronize sequence number event 330, standby security device 120' creates the flow for the IPsec SA, and generates a new sequence number for the outbound IPsec SA, based on the sequence number received from active security device 110'. This new sequence number is used later, when and if standby security device 120' takes over as the active device. New flow synchronization and sequence number generation will be described in further detail in connection with FIG. 5.

Moving on to FIG. 3B, the flow of packets on the outbound IPsec SA continues between IPsec protocol logic 170' components within peer security device 150' and active security device 110', as indicated by flow 340. As mentioned above, in addition to providing a network function through protocol logic 170, active security device 110' and standby security device 120' also cooperate to make this network function redundant. To this end, active security device 110' periodically sends an event 350 to standby security device 120', which lets standby security device 120' know that active security device 110' is still operating as the active device. Event 350 may be referred to, for example, as a keep-alive, a ping, or a heartbeat. Periodic event 350 does not include a sequence number for flow 340. Instead, the process used by standby network device 120 to generate the flow sequence number for flow 230 (described herein) allows standby security device 120' to process packets as soon as standby security device 120' becomes active.

Turning now to FIG. 3C, after some number of packets are exchanged between peer security device 150', standby security device 120' receives a switchover event 360, indicating that standby security device 120' should now take over in the active role. In FIG. 3C, switchover event 360 is indicative of a graceful failover and originates from active security device 110'. However, in a hard failover scenario, switchover event 360 may instead originate internally within standby security device 120', for example, as a result of a timeout indicating loss of communication with active security device 110' (e.g., ceasing to receive a heartbeat packet).

The first packet in the flow 340 which is transmitted by standby security device 120' after takeover uses the specially generated sequence number. Successive packets transmitted by standby security device 120' increase from this starting point. This special sequence number allows standby security device 120' to avoid monitoring the sequence numbers actually transmitted by active security device 110' while being able to take over from active security device 110' without causing an error in the sequence number expected by IPsec protocol logic 170' within peer security device 150'.

Once flow sequence numbers are updated, the first packet in the flow 340 which is transmitted by standby security device 120' after takeover uses the specially generated sequence number from the synchronize sequence number event 330 (FIG. 3A). Successive packets transmitted by standby security device 120' increase from this starting point. This special sequence number allows standby security device 120' to avoid monitoring the sequence numbers actually transmitted by active security device 110' while being able to take over from active security device 110' without causing an error in the sequence number expected by IPsec protocol logic 170' within peer security device 150'. The specific manner in which the sequence number is generated by standby security device 120' allows standby security device 120' to take over packet transmission for all flows in a manner which is not viewed by peer security device 150' as an error. Sequence number generation and update will be described in further detail in connection with FIG. 5.

In a graceful failover, network device 110' transitions automatically to the standby role after relinquishing the active role. As part of this transition, now-standby network device 110' synchronizes its flow-specific starting sequence numbers with those used by now-active network device 120'. Messages from now-active network device 120' are not used to achieve this synchronization after graceful failover. Instead, now-standby network device 110 increments its local starting sequence number by a multiple of the amount used by active network device 120'. In some embodiments, the multiple is two. The increment process will be described further in connection with FIG. 5.

In contrast, after a hard failover, now-active network device 120' instructs now-standby network device 110' to synchronize the sequence number of the flow, by sending synchronize sequence number event 330 to now-standby network device 110'. As described earlier, synchronize sequence number event 330 includes the starting sequence number which now-active network device 120' will use for the packet flow. Now-active network device 120' synchronizes sequence numbers for all flows in this manner. In some embodiments, starting sequence numbers for multiple flows may be combined into the same synchronize sequence number event 330. In other embodiments, the starting sequence number for each flow is provided in a separate synchronize sequence number event 330.

Figure 4A:
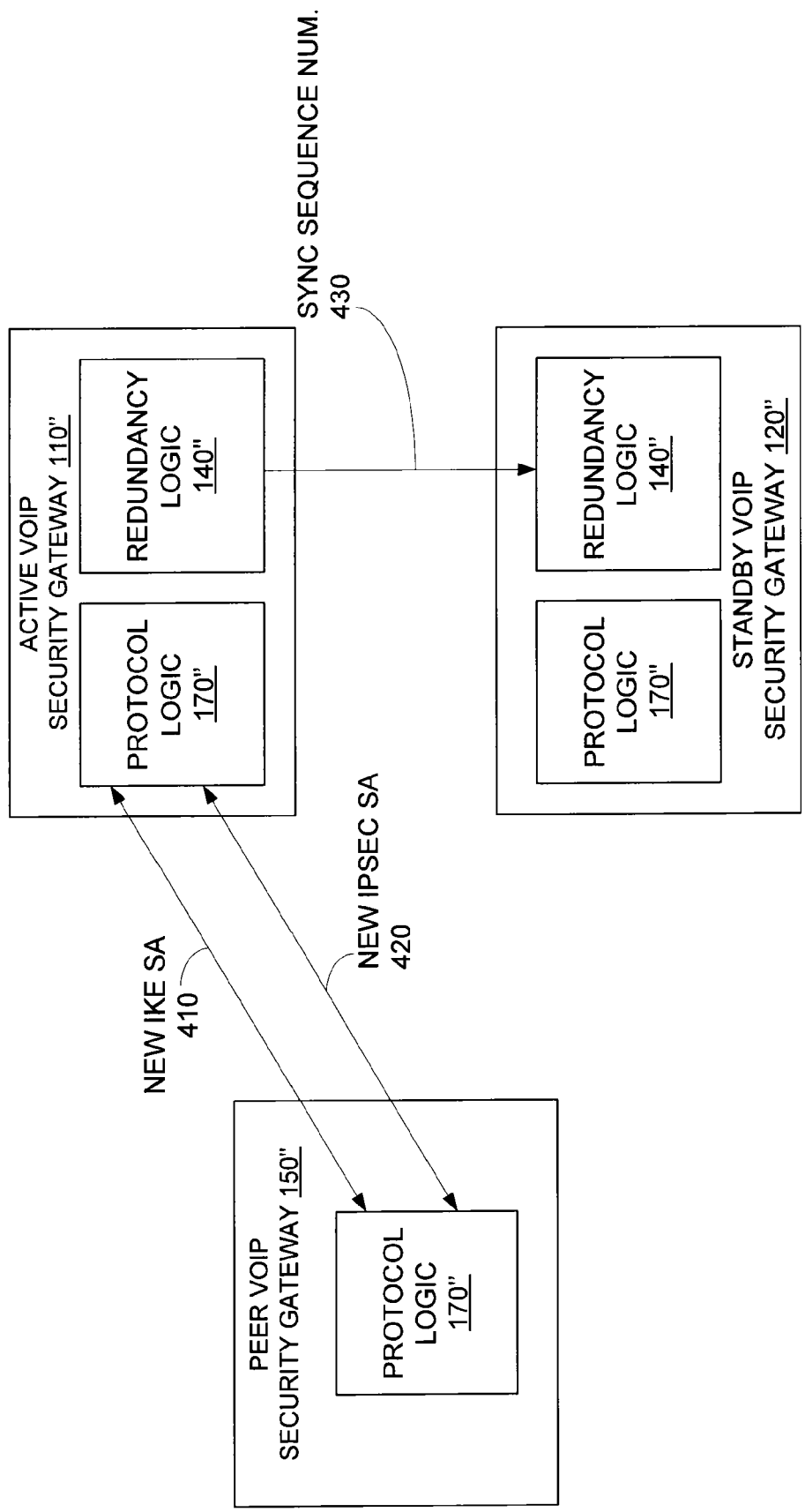
FIGS. 4A-4C form a sequence diagram showing interaction among the components of FIG. 1, according to still other embodiments disclosed herein.
Figure 4B:
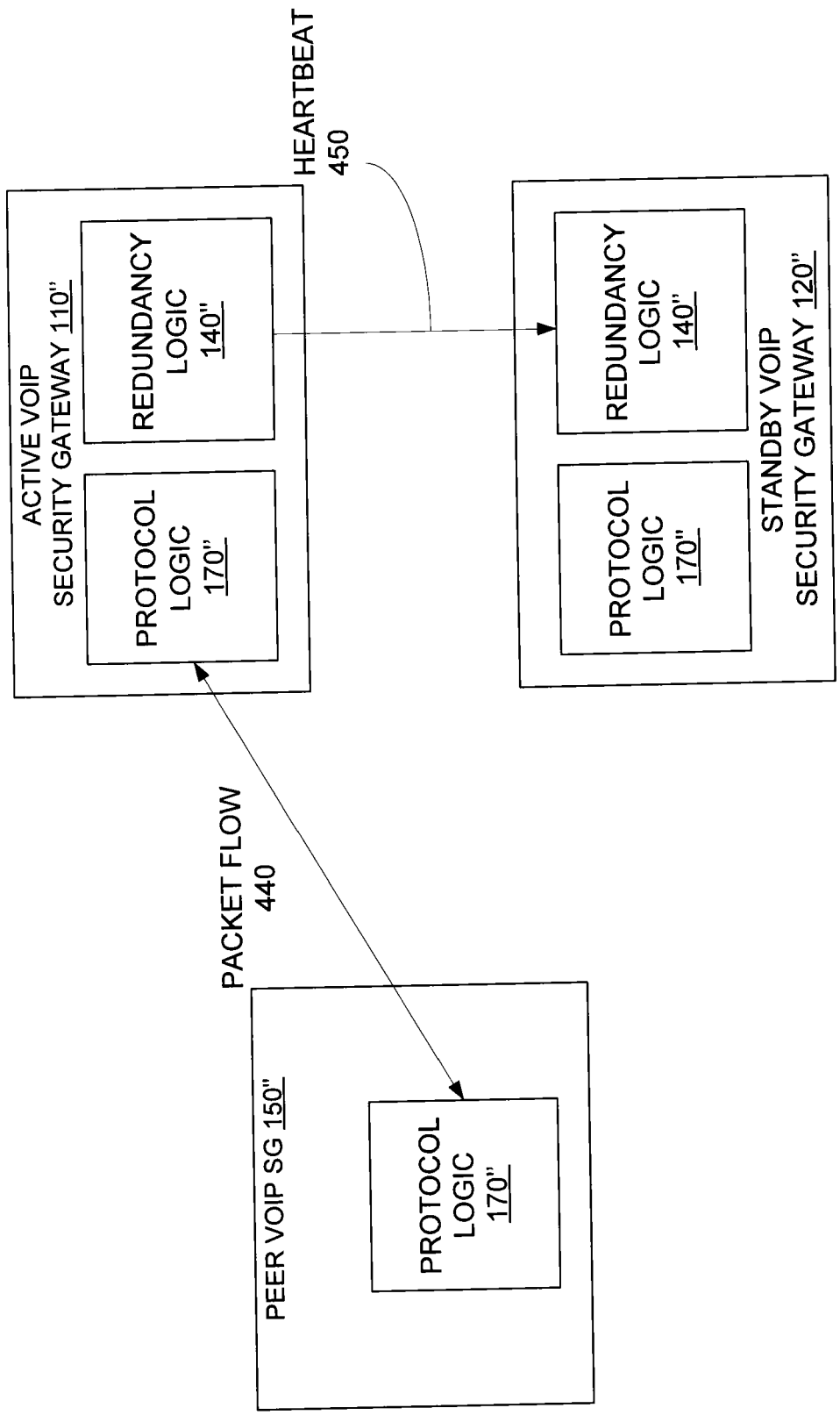
Figure 4C:
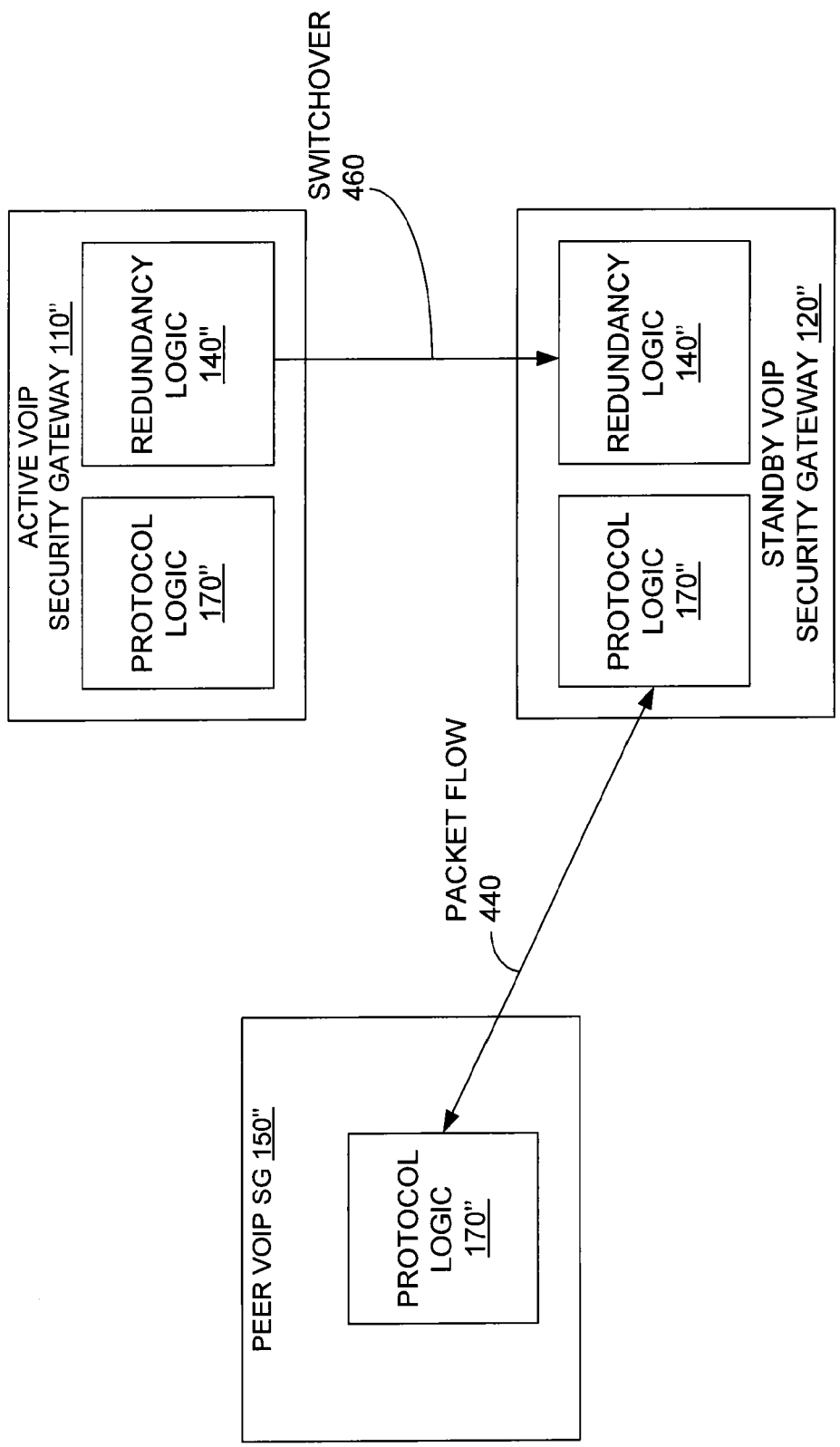

The embodiment described in connection with FIGS. 3A-3C described synchronizing sequence numbers for outbound IPsec SAs. The sequence diagram of FIGS. 4A-4C illustrates operation of a specific kind of security gateway, namely, a voice over Internet protocol (VoIP) security gateway. In recognition of this role, the devices in FIGS. 4A-4C are referred to as active VoIP security gateway 110", standby VoIP security gateway 120", and peer VoIP security gateway 150".

VoIP IPsec protocol logic 170" within peer VoIP security gateway 150" and active VoIP security gateway 110" cooperate to create an IKE security association (SA) (event 410). VoIP IPsec protocol logic 170" then creates an IPsec SA (event 420) under the protection of the IKE SA. In the VoIP IPsec embodiment of FIGS. 4A-4C, VoIP IPsec redundancy logic 140" is at least responsible for synchronizing each inbound and outbound IPsec SA to standby VoIP security gateway 120" and for generating the sequence numbers for each outbound IPsec SA.

Thus, in response to creation of a new IPsec SA at event 420, VoIP IPsec redundancy logic 140" within active VoIP security gateway 110" instructs VoIP IPsec redundancy logic 140" within standby VoIP security gateway 120" to create the same IPsec SA but using a different sequence number. Specifically, active VoIP security gateway 110" sends a synchronize sequence number event 430 to standby VoIP security gateway 120" The new flow event 420 provides a starting sequence number and may also include packet flow information, such as a flow identifier, SA, etc. On receipt of synchronize sequence number event 430, standby VoIP security gateway 120" creates the flow for the IPsec SA, and generates a new sequence number for the outbound IPsec SA, based on the sequence number received from active VoIP security gateway 110". This new sequence number is used later, when and if standby VoIP security gateway 120" takes over as the active device. New flow synchronization and sequence number generation will be described in further detail in connection with FIG. 5.

Moving on to FIG. 4B, the flow of packets on the outbound IPsec SA continues between VoIP IPsec protocol logic 170" components within peer VoIP security gateway 150" and active VoIP security gateway 110", as indicated by flow 440. As mentioned above, in addition to providing a network function through protocol logic 170, active VoIP security gateway 110" and standby VoIP security gateway 120" also cooperate to make this network function redundant. To this end, active VoIP security gateway 110" periodically informs (through event 450) standby VoIP security gateway 120" of the health of active VoIP security gateway 110" (heartbeat). There is no need to synchronize any information for any IPsec SA while active VoIP security gateway 110" processes any flow packets.

To this end, active VoIP security gateway 110" periodically sends an event 460 to standby VoIP security gateway 120", which lets standby VoIP security gateway 120" know that active VoIP security gateway 110" is still operating as the active device. Event 460 may be referred to, for example, as a keep-alive, a ping, or a heartbeat. Periodic event 460 does not include a sequence number for flow 440 and there is no need to synchronize any information for any IPsec SA while active VoIP security gateway 110" processes any packets in any flow. Instead, the process used to generate the flow sequence number for flow 440 (described herein) allows standby VoIP security gateway 120" to process packets as soon as standby VoIP security gateway 120" becomes active.

Turning now to FIG. 4C, after some number of packets are exchanged between peer VoIP security gateway 150", standby VoIP security gateway 120" receives a switchover event 470, indicating that standby VoIP security gateway 120" should now take over in the active role. In FIG. 4C, switchover event 360 is indicative of a graceful failover and originates from active VoIP security gateway 110". However, in a hard failover scenario, switchover event 360 may instead originate internally within standby VoIP security gateway 120", for example, as a result of a timeout indicating loss of communication with active VoIP security gateway 110" (e.g., ceasing to receive a heartbeat packet).

The first packet in the flow 440 which is transmitted by standby VoIP security gateway 120" after takeover uses the specially generated sequence number. Successive packets transmitted by standby VoIP security gateway 120" increase from this starting point. This special sequence number allows standby VoIP security gateway 120" to avoid monitoring the sequence numbers actually transmitted by active VoIP security gateway 110" while being able to take over from active VoIP security gateway 110" without causing an error in the sequence number expected by VoIP IPsec protocol logic 170" within peer VoIP security gateway 150".

Once flow sequence numbers are updated, the first packet in the flow 440 which is transmitted by standby VoIP security gateway 120" after takeover uses the specially generated sequence number from the synchronize sequence number event 430 (FIG. 4A). Successive packets transmitted by standby VoIP security gateway 120" increase from this starting point. This special sequence number allows standby VoIP security gateway 120" to avoid monitoring the sequence numbers actually transmitted by active VoIP security gateway 110" while being able to take over from active VoIP security gateway 110" without causing an error in the sequence number expected by VoIP IPsec protocol logic 170" within peer VoIP security gateway 150". The specific manner in which the sequence number is generated by standby VoIP security gateway 120" allows standby VoIP security gateway 120" to take over packet transmission for all flows in a manner which is not viewed by peer VoIP security gateway 150" as an error. Sequence number generation and update will be described in further detail in connection with FIG. 5.

In a graceful failover, network device 110" transitions automatically to the standby role after relinquishing the active role. As part of this transition, now-standby network device 110" synchronizes its flow-specific starting sequence numbers with those used by now-active network device 120". Messages from now-active network device 120" are not used to achieve this synchronization after graceful failover. Instead, now-standby network device 110" increments its local starting sequence number by a multiple of the amount used by active network device 120". In some embodiments, the multiple is two. The increment process will be described further in connection with FIG. 5.

In contrast, after a hard failover, now-active network device 120" instructs now-standby network device 110" to synchronize the sequence number of the flow, by sending synchronize sequence number event 430 to now-standby network device 110". As described earlier, synchronize sequence number event 430 includes the starting sequence number which now-active network device 120" will use for the packet flow. Now-active network device 120" synchronizes sequence numbers for all flows in this manner. In some embodiments, starting sequence numbers for multiple flows may be combined into the same synchronize sequence number event 430. In other embodiments, the starting sequence number for each flow is provided in a separate synchronize sequence number event 430.

Figure 5:
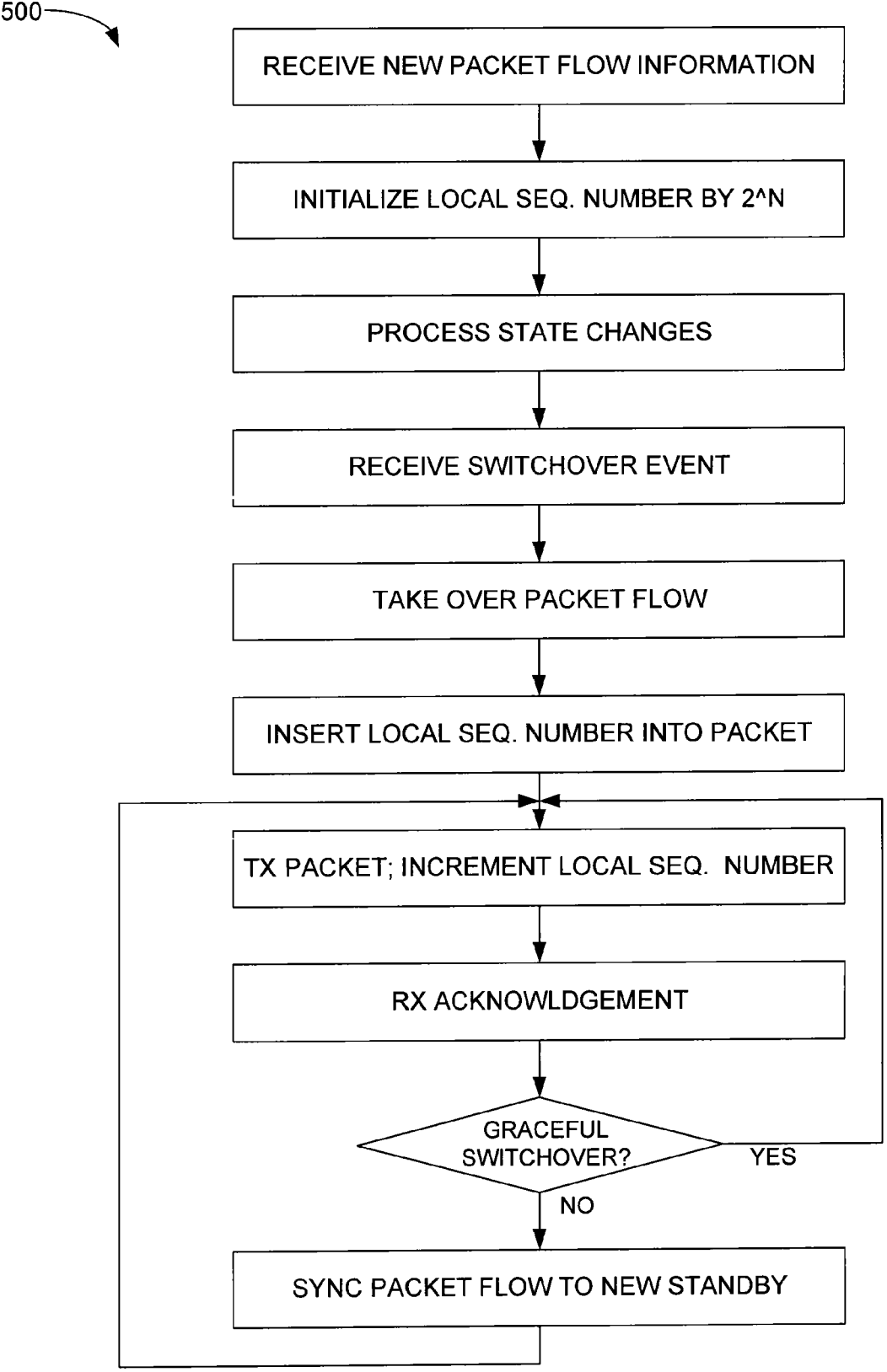
FIG. 5 is a flowchart describing operation of the standby network device of FIG. 1 according to some embodiments disclosed herein.

FIG. 5 is a flowchart describing operation of standby network device 120, including redundancy logic, according to some embodiments. Process 500 begins at block 510, where redundancy logic of standby network device 120 receives information from active network device 110 about a packet flow that has been created between active network device 110 and packet exchange peer device 150. The packet flow information includes a starting sequence number S, i.e., the sequence number which active network device 110 will include in the first packet of the flow. In some embodiments, the starting sequence number S is zero, but other embodiments may use an initial value other than zero.

In response to the information about a new packet flow, at block 520 redundancy logic of standby network device 120 creates the packet flow, which includes initializing a local sequence number L associated with the new packet flow. Local sequence number L will be used at a time when and if standby network device 120 takes over the active role and commences packet exchange with packet exchange peer device 150 in place of active network device 110. The local sequence number L is initialized by incrementing the starting sequence number provided by active network device 110 by a value $2^N$:

$$L=S+2^N,$$

where N is related to, but less than, the size of the sequence number field M. In some embodiments $N >= \frac{3}{4} * M$.

The value for N can be chosen such that the probability, at the time of switchover, of the number of packets transmitted on the flow being greater than $2^N$ is relatively low. For example, if the sequence number size M is 32 and $N=\frac{3}{4}*M=24$, then $S=2^{24}=16$ million. At a packet rate of one per second, it would take 185 days for the sequence number in the flow to reach $2^{24}$. The probability that the flow is continuous for 185 days is acceptably low in many use cases.

Having initialized the sequence number for each new flow, process 500 continues at block 530, where standby network device 120 receives one or more state changes from active network device 110. In some embodiments, standby network device 120 receives all state changes from active network device 110. As noted above, active network device 110 exchanges packets with packet exchange peer device 150, (e.g. TCP packets, UDP packets, IPsec packets, etc.) and these state changes help prepare standby network device 120 to take over packet exchange operation from active network device 110. Significantly, after blocks 510 and 520 standby network device 120 performs no more sequence number synchronization actions with active network device 110 for packet flows between active network device 110 and packet exchange peer device 150, as blocks 510 and 520 provide all the information needed by standby network device 120 to properly synchronize sequence numbers in the event of a failover.

Process 500 continues to process new packet flows (blocks 510 and 520) and other state changes (block 530) until standby network device 120 receives a switchover event at block 540. The switchover event may take the form of a command from active network device 110, a timeout indicating lack of communication from active network device 110 for a specific period of time (implying that active network device 110 is no longer active), or any other suitable mechanism. In response to the switchover event of block 540, at block 550 standby network device 120 becomes active and takes over packet exchange operation with packet exchange peer device 150 in place of active network device 110. This takeover may include, for example, new binding of media access control (MAC) layer addresses on standby network device 120 with configured network interfaces. As a result of the takeover, all packet flows to/from packet exchange peer device 150 are to/from previously-standby now-active network device 120.

Taking over packet exchange operation includes transmitting the next packet in the sequence as expected by packet exchange peer device 150. As noted earlier, standby network device 120 is not aware of the sequence numbers transmitted by active network device 110 before the failover. At block 560, standby network device 120 inserts local sequence number L into the sequence field of the next packet to be transmitted. Next at block 570 standby network device 120 transmits the packet and increments L by an amount defined by the particular protocol. In some embodiments, the increment is one. At block 580 standby network device 120 receives an acknowledgement packet exchange peer device 150.

In a graceful failover scenario, the previously-active device moves to the standby role, and as such, has a chance to update its own local sequence number L. Therefore, at block 590, network device 120 (now acting in the active role) determines whether the switchover event 540 indicated a graceful failover or a hard failover. If block 590 indicated a hard failover, then at block 5100 now-active network device 120 synchronizes the packet flow created at block 510 to now-standby network device 110. The synchronization process used by now-standby network device 110 is the same as that described earlier in connection with block 520, i.e., incrementing the received sequence number by a value of $2^N$. If block 590 indicated a graceful failover, there is no need for any synchronization for the packet flow from now-active network device 120. On now-standby network device 110, the local sequence number P for the same packet flow is incremented from its initial value S by $2*2^N$ as $$P=S+2*2^N$$

Process 500 continues to exchange packets with packet exchange peer device 150, repeating blocks 570 and 580 as appropriate. In the embodiment described by FIG. 5, the protocol uses an acknowledgement for every transmitted packet. In other embodiments, the protocol allows the receiver to acknowledge multiple packets with a single acknowledgement.

In the embodiment described above, standby device 120 initializes local sequence number L at the time a new packet flow is created, by incrementing the starting sequence number S provided by active network device 110. When the switchover event occurs later, the pre-initialized local sequence number L is then immediately available to be inserted into the first packet transmitted by the previously-standby and now-active network device. In another embodiment, the standby device stores the starting sequence number S when a new packet flow is created, but does not initialize L from S at this time. Instead, in this alternative embodiment the initialization of L by incrementing S is deferred until the switchover event is received.

After a packet flow is created, for each failover, the sequence number for the flow will be incremented by $2^N$ on the standby network device. As a result, the sequence number of a flow could overflow the size of the sequence number (M) given enough failovers. Though this is unlikely any operational network, it is still possible. To prevent sequence number overflow, network device 110 and/or 120 may examine the sequence number for a flow, and if the sequence number is close to its limit, a rekey may be initiated. The rekey sets up a new flow to replace the old flow, so that the sequence number starts over with the new flow.

FIG. 6 is a block diagram of active network device 110 and/or standby network device 120, according to some embodiments disclosed herein. Device 110, 120 includes a processor 610, memory 620, a network interface 630, a storage device 640 (e.g., non-volatile memory or a disk drive), and one or more input output (I/O) interfaces 650. These hardware components are coupled via a bus 660. Omitted from FIG. 6 are a number of components that are unnecessary to explain the operation of active network device 110 and standby network device 120.

Redundancy logic can be implemented in software (i.e., instructions executing on a processor). FIG. 6 depicts a software implementation, with memory 620 storing redundancy logic. Redundancy logic can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). Persons of ordinary skill should also appreciate that these components may be implemented using any combination of hardware and software.

In some embodiments of active network device 110 and/or standby network device 120, the software-implemented redundancy logic is stored on a computer-readable medium, which in the context of this disclosure refers to any structure which can contain, store, or embody instructions executable by a processor. The computer readable medium can be, for example but not limited to, based on electronic, magnetic, optical, electromagnetic, infrared, or semiconductor technology. Specific examples of a computer-readable medium using electronic technology would include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method of synchronizing sequence numbers associated with a security association for a protocol used to communicate with a communication peer, the method comprising:
   receiving a sequence number synchronization request from a redundancy peer, the sequence number synchronization request indicating a security association;
   after the sequence number synchronization request, incrementing by a fixed amount a packet sequence number for the security association, wherein the incrementing comprises incrementing the packet sequence number for the security association by $2^N$, where N is an integer less than a number of bits in a packet sequence number field used by the protocol; and
   transmitting a next packet including the incremented packet sequence number to the communication peer.

2. The method of claim 1, wherein the incrementing is responsive to the sequence number synchronization request.

3. The method of claim 1, wherein the security association is an outbound Internet Protocol security association (IPsec SA).

4. The method of claim 1, wherein the security association is also used by the redundancy peer to communicate with the communication peer.

5. The method of claim 1, wherein the incremented packet sequence number is unrelated to a next sequence number maintained by the redundancy peer.

6. A method of synchronizing sequence numbers associated with a security association for a protocol used to communicate with a communication peer, the method comprising:
   receiving a sequence number synchronization request from a redundancy peer, the sequence number synchronization request indicating a security association;
   after the sequence number synchronization request, incrementing by a fixed amount a packet sequence number for the security association, wherein the incrementing comprises incrementing the packet sequence number for the security association by $2^N$, where N is an integer, $N<M$, and $N>\frac{2}{3}*M$, where M is a number of bits in a packet sequence number field used by the protocol, and
   transmitting a next packet including the incremented packet sequence number to the communication peer.

7. The method of claim 6, wherein the security association is an Internet Protocol security association (IPsec SA).

8. The method of claim 6, wherein the incremented packet sequence number is unrelated to a next sequence number maintained by the redundancy peer.

9. A method of synchronizing sequence numbers used by a protocol to communicate with a communication peer, the method comprising:
   receiving a sequence number synchronization request from a redundancy peer, the sequence number synchronization request associated with a packet flow;
   after the sequence number synchronization request, incrementing by a fixed amount a packet sequence number for the packet flow, wherein the incrementing comprises incrementing the packet sequence number for the packet flow by $2^N$, where N is a number less than a number of bits in a packet sequence number field used by the protocol; and
   transmitting a next packet including the incremented packet sequence number to the communication peer.

10. The method of claim 9, wherein the sequence number synchronization request includes the packet sequence number for the packet flow.

11. A method of synchronizing sequence numbers used by a protocol to communicate with a communication peer, the method comprising:
   receiving a sequence number synchronization request from a redundancy peer, the sequence number synchronization request associated with a packet flow;
   after the sequence number synchronization request, incrementing by a fixed amount a packet sequence number for the packet flow, wherein the incrementing comprises incrementing the packet sequence number for the packet flow by $2^N$, where N is an number less than M and greater than $\frac{2}{3}*M$, where M is a number of bits in a packet sequence number field used by the protocol; and transmitting a next packet including the incremented packet sequence number to the communication peer.

12. The method of claim 11, wherein the incremented packet sequence number is unrelated to a next sequence number maintained by the redundancy peer.

13. The method of claim 11, wherein the incremented packet sequence number is unrelated to a next sequence number maintained by the redundancy peer.

14. A network device comprising:
   memory; and
   a processor configured by instructions retrieved from the memory, while operating in a standby mode, to:
      receive an indication of a synchronization start for a security association;
      increment a start sequence number included in the synchronization start indication to produce a local sequence number by incrementing the start sequence number for the security association by $2^N$, where N is a number related to but less than a number of bits in a packet sequence number field;
      transmit a packet for the security association using the incremented start sequence number, responsive to failure detection of an active redundancy peer computing device;
      increment the local sequence number to produce a successive sequence number, responsive to the packet transmission;
      transmit a successive packet using the successive sequence number.

15. The network device of claim 14, wherein the processor is further configured by the instructions to produce the successive sequence number by incrementing the local sequence number by one.

16. The security gateway of claim 15, wherein the processor is further configured by the instructions, while operating in an active mode to:
   transmit the indication of the synchronization start for the security association.

17. The network device of claim 14, wherein the incremented packet sequence number is unrelated to a next sequence number maintained by a redundancy peer of the network device.

18. A voice over Internet Protocol (VoIP) security gateway comprising:
   network interface logic;
   memory; and
   a processor configured by instructions retrieved from the memory, while operating in a standby mode, to:
      receive, through the network interface logic, an indication of a synchronization start for a security association;
      increment a start sequence number for the security association responsive to the synchronization start indication to produce a local sequence number by incrementing the start sequence number for the security association by $2^N$, where N is an integer less than a number of bits in a packet sequence number field.

19. The VoIP security gateway of claim 18, wherein the processor is further configured by the instructions to produce the successive sequence number by incrementing the local sequence number by one.

20. The VoIP security gateway of claim 18, further comprising hardware security logic, where the processor is further configured by the instructions, when operating in an active mode, to:
   request the hardware security logic to create the security association; and
   transmit, through the network interface logic, the indication of a synchronization start for the security association.

21. The VoIP security gateway of claim 18, wherein the incremented packet sequence number is unrelated to a next sequence number maintained by a redundancy peer of the VoIP security gateway.

* * * * *